Patented May 30, 1944

2,350,252

UNITED STATES PATENT OFFICE 2,350,252

SHOE FILLER COMPOSITION AND METHOD OF MAKING

Ernest D. Sackett, Winchester, Mass., assignor of one-half to North American Holding Corporation, Syracuse, N. Y., a corporation of New York, and one-half to Parshad Holding Corporation, Syracuse, N. Y., a corporation of New York No Drawing. Application July 11, 1941,
Serial No. 401,975

21 Claims. (Cl. 106—38)

This invention relates to a method of making shoe filler compositions and to the resulting products.

In the preparation of "cold" shoe filler compositions heretofore an underlying principle has been employed of mixing a granular solid component of resilient material, such as ground cork, with a liquid binder component, and then restraining the fluidity of the binder by adding cork dust or fines, which impress upon the liquid binder a plastic as distinguished from a viscous flow, under sudden heat or pressure, or both.

But in such compositions it is now recognized that the inherently liquid binder continues to be liquid and to be subject to liquid flow, even though it may be more or less restrained in such flow so as to impart plastic flow generally to the composition as a whole during the spreading operation and until the other shoe manufacturing operations have been completed.

It is an object of the present invention to provide improved shoe filler compositions and an improved method of making the same. It is also an object to provide compositions for this purpose which shall be easy, convenient and safe to apply, and which shall retain their integrity and flexibility, and manifest an inherently plastic flow in the binder, in contrast to liquid flow or penetration in shoe fillers as heretofore prepared. Other objects will appear from the following disclosure.

It is discovered, in accordance with the present invention, that if a resilient granular body material is employed, such as ground cork, and commingled with soft, readily deformable, but appreciably elastic flocs—the individual particles of which are of diffuse structure and wet—and if such flocculent particles are of an order of size commensurate with or smaller than that of the interstices of the comminuted granular body material, they will exhibit an inherently elastic, plastic flow and impart this characteristic to the filler composition as a whole.

In such a composition, it is found that the spaces between the solid granular component of cork particles will tend to be more or less filled by the soft deformable flocs. Since the latter are of the order of size of the interstices between the cork granules or smaller, and since they are also soft and readily deformable, they assume the role of a dispersing medium between the cork granules. The additional factor of being wet with a liquid vehicle or sleeking agent will also contribute to their functioning in this way.

With reference to the cork granules, therefore, the effective degree of dispersion will depend upon the relative amounts or volumes of the elastic floc material and of the wetting vehicle or liquid mixed with them.

If the cork granules be regarded as spheres (for purposes of considering their relative packing) it will be readily recognized that they may be "close-packed"—in which case each granule is in contact with the granules next adjacent to it—or "dense-packed"—in which case not only is each granule in contact with the adjacent granules, but in such packing relationship or arrangement that the mass of granules as a whole will occupy a minimum volume, which accordingly can not be reduced by rearrangement but only by disruption (or compression) of some of the individual granules making up any given mass.

In the course of loose handling, cork granules are not more dense, in their arrangement, than "close-packed" as above described. Upon mixing them with elastic flocs which are individually of a size smaller than the interstices between them, three conditions may be presented, in which the flocs are: (1) insufficient in volume to fill the interstices; (2) just sufficient to fill the interstices; and (3) more than sufficient to fill the interstices between the close-packed granules.

When such flocs are wet, they promote slippage not only upon one another, thus manifesting a sort of slimy consistency, but also upon and between the granules of cork. Hence they effectively serve as a plastic vehicle for the solid cork granules and the resulting composition is plastic. But the wetted flocs are not—whether alone or as the binder component or vehicle for the cork granules—either liquid or capable of liquid flow.

It may be shown that "close-packed" granular materials, such as the granular cork, above referred to, may be re-arranged to a dense-packing by compression (and jarring) or by slight compression and a shearing or spreading action, such as encountered in the spreading operation of applying shoe filler compositions to shoe bottoms. The lubricating and plastic properties of the intervening wet flocs will both permit and promote such re-arranging of the cork granules from loose-packing to close-packing and also to dense-packing arrangements.

By "elastic" as above used, is meant: capable of ready deformation, relative to size or shape, upon the application of moderate forces of compression, expansion, or extension (such as are employed in the preparation and in the application of shoe filler compositions to the shoe) but resistant thereto by an opposing force which increases with the amount and rate of deformation, and capable of spontaneously returning from such deformation substantially to the original size and shape when the force of compression, expansion or extension is discontinued.

The mixture of granules with soft distended flocs of elastic material dispersed in the interstices between the granules, with or without a liquid vehicle, presents certain characteristic phenomena not heretofore manifested by shoe filler compositions.

When such a mixture of granules and wet flocs is converted from close-packing, where each granule is merely in contact with those adjacent to it as above described, to dense-packing in which the contacting granules are so arranged as to leave a minimum of interstitial space therebetween, the flocs may be compressed together and between the granules—so as to exert an elastic pressure outwardly upon such granules and throughout the mass as a whole, and thus give the shaped mass an elastic quality in addition to that which the granules may possess individually.

In such conversion from loose-packing to close-packing to dense-packing, in the arrangement of the granules, the overall contraction in the volume of the mass is rather slight. Nevertheless, since the granular material is less compressible, the wet flocs must give or compress or the liquid must escape, in order for such re-arrangement to occur. These changes no doubt take place. They may be accomplished by evaporation of the liquid vehicle, and escape as a gas, or by migration to the surface of the mass or by absorption into the cork granules. Some of the liquid portion of the binder may, therefore, during or at the end of these stages, be thus completely removed from the mass, as by evaporation.

Since the granules are not adhesive and since the elastic flocs may not be sufficiently adhesive, the mass thus resulting might not be firmly integrated, per se, nor adequately retained in the finished shoe. Therefore, it is generally desirable or necessary to provide an additional adhesive which is capable, especially in the final stage, of adhering to both the flocs and to the granules, and of thus holding them together in the form of an integrated mass and in position in the sole of the shoe.

Certain hydrocarbon polymers, such as rubber, etc., present some of the above-required characteristics, but in general the elasticity which such compounds exhibit in dispersions is of such an order that they would require too great a distorting force. That is, they are elastic but too stiff. A softer, more sensitive, albeit truly elastic floc, is therefore desirable. Moreover, it must not be dissolved nor tacky in the liquid vehicle employed.

Such a satisfactory flocculent or floc-forming material is found in certain fossil gums, which are characteristically insoluble in water and in solvent organic liquids generally. They are hard in their natural state, and hence susceptible of ready comminution to substantially any desired size or range of sizes. The resulting particles are susceptible to swelling, by organic liquid solvents of the more active type—to form characteristically elastic flocs. The swollen flocs are voluminous, form-retaining, non-tacky, inert. Furthermore, since they do not dissolve they are substantially without viscosity effects upon the swelling or other solvent vehicle with which they are treated. Being of relatively high melting point, the swollen flocs of such gums do not cohere nor adhere, readily, nor soften, under heat or pressures, at least of any ordinary magnitude such as would be encountered by shoe filler compositions, but readily contract and again expand upon release of such pressures.

It will be observed that these are different functions from those which viscose fluid materials or most plastic solid substances can exhibit under the circumstances imposed upon shoe filler compositions. They also differ from elastic solid particles requiring too great a force to effect sufficient distortion to make them amenable to passage through the fine interstitial spaces. They differ further in being thus rendered adaptable to the movements required of the binder component, as well as in their subsequent ability to expand upon release of pressure and to check further movement of the binder and cork.

To these ends, it is now found that certain fossil gums, such as Congo gum and Zanzibar gum, lend themselves especially to the acquisition of the above-described properties.

Un-run Congo gum is essential to be used in the present composition rather than a "run" gum, because if a "run" Congo gum or "run" Zanzibar gum were employed, it is found to be freely soluble in most organic solvents and not capable of assuming or re-assuming the condition of flocs, which is especially desirable.

By grinding or pulverizing such gums, which are hard and brittle, they may be reduced to any desired degree of fine particle size and then readily dispersed in liquids. By using active organic solvents, such particles will be swollen, more or less proportional to the size of the particles. Upon swelling, therefore, the dispersed particles form soft, distended, relatively voluminous flocs (compared to the particles from which they are formed) which are individually elastic, as above defined, and otherwise especially suited to develop and manifest the other properties and functions in the shoe filler which are desirable, as set out above, to promote the preparation and use and also to develop and retain the desired properties of such compositions.

Such swelling of the gum particle by organic solvents will vary in degree with the different solvents used and also in accordance with the specific origin and quality of the un-run Congo gum itself. A corresponding variation in the consistency of the swollen gum particles will also result. Nevertheless such variations are not sufficiently great to render the swollen gum unsuitable for the present purposes.

In a typical example of carrying out the invention in actual practice, a shoe filler composition may be prepared as follows:

A

First mix:

|   | Pounds |
|---|---|
| Ethyl acetate | 84 |
| Petroleum naphtha (B. P., 140–190° F. and substantially free from aromatic hydrocarbons) | 25 |
| Dibutyl phthalate | 10 |
| Film scrap | 18 |

Agitate or stir the mixture until a substantially homogeneous solution is obtained.

B

Then mix:

|   | Pounds |
|---|---|
| Refined tall oil | 40¾ |
| Un-run Congo fossil gum in finely powdered condition | 12 |

Agitate until the particles of gum are dispersed in the tall oil.

C

Then add mixture B to mixture A and, with continued agitation, mix in 50 pounds petroleum naphtha and 90 pounds of powdered resin which is obtained as a residue from the refining of wood rosin, such as that obtained from dead pine wood stumps and which, while it may incidentally contain some ordinary rosin, is composed in considerable proportion (50% or more) or completely of a resin or resinous material which is characterized by being substantially insoluble in gasoline, and by having a melting point higher than that of ordinary wood rosin, a saponification number lower than that of ordinary wood rosin, and a dark color. It is freely soluble in the ethyl acetate contained in or containing the dissolved film scrap. Moreover, an ethyl acetate solution of film scrap will tolerate the addition of larger proportions of such resin without precipitating the film scrap from solution than of ordinary rosin. Typically Belro resin B which is made by Hercules Powder Company, may be used as such resin.

In the above procedure, instead of adding B to A, before the addition of C, the mixture C may be incorporated directly in the mixture A and mixture B then added. Moreover, the powdered fossil gum may be added in powdered form without previous dispersion in the tall oil, except that it tends to form lumps. And in general, the order of steps may be otherwise changed if convenient.

The large proportion of resin thus incorporated into the mixture is desirable in order for it to serve its function as an adhesive and consequently the necessity of its ultimately providing (in the composition as it is left in the finished shoe) a thin coating of adhesive over all of the extensive surfaces of the particles of granular cork and between the cork and flocs of swelled fossil gum. Since it is dissolved in the ethyl acetate to a thin solution and dispersed or emulsified in the non-solvent petroleum naphtha, it does not materially interfere with the properties of the flocs, as above described, except to act as a wetting vehicle for them.

It is important that the resin above described be used instead of ordinary rosin, which is largely or completely soluble in aliphatic hydrocarbon liquid solvents, such as petroleum naphtha, and which would, therefore, dissolve to a uniform solution which is freely fluid and penetrative whereas the resin above defined, materially develops increased viscosity which it imparts to and between the binder component and granular component of cork, without presenting free liquid flow or penetration characteristics.

The resulting binder component of the composition, as thus prepared, is then ready for admixture with the granular body material, which may be in the form of granular cork, of which 30 gallons of 20/30 mesh size is added to and dispersed in 100 pounds of the binder, and the whole kneaded together to uniformity and packed in air-tight tin cans.

In this condition the material may be stored or shipped and kept until it is required for use. The can may then be opened and the material, of the original consistency and adapted without further treatment for withdrawal and application to the shoe, may be spread at once. It spreads freely beneath the spreading knife without sticking to it, but adheres quickly and firmly to the shoe beneath and behind the spreading knife. It accordingly permits quick, continuous and smooth spreading of the composition in the shoe and leaves a deposit accurately conforming to the shoe cavity, firmly anchored therein and with a smoothly finished top surface. One function leading to this result is the elasticity of the particles of swollen Congo gum which they impart to the binder component. This tends to cause the filler composition to build up slightly before the rapid sweep of the spreader knife— to elongate slightly and to draw out beneath the spreader knife, between the edge of the blade and the shoe bottom—and to contract slightly behind the knife when it has passed beyond the given area. This promotes continuity of the binder-granule mixture throughout the spreading action and a more firmly integrated structure of the deposit left in the shoe. Upon loss of solvent, or immediately, under pressure of spreading, molding, etc., the granules pass from close to dense formation and since the swollen particles of Congo gum remain swollen or partly so, upon being thus further confined they more nearly fill the interstices and exert their elasticity between the cork granules which, in such dense packing arrangement, can not shift.

These functions of the swollen, discrete flocs and of the binder component, and of the filler composition resulting from the admixture of such binder component with the granular body material, are effective to make the handling and spreading operations, in applying it to the shoe, especially easy and convenient. They assure, for example, the dependable withdrawal of the right amount of filler for a single shoe, from the supply mass, the adhesion of this charge to the shoe upon depositing it in the cavity of the shoe bottom, the smooth and rapid spreading of the filler throughout the cavity (two or three easy, quick strokes being sufficient) the formation of a continuous, smooth, free surface of the deposit (with three or four strokes of the spreading knife at most) and the firm retention of the resulting deposit therein, and of its size, shape, strength and elastic consistency as a whole and as an integrated part of the shoe.

The elasticity of the swollen Congo gum persists in the filled shoe, especially when the swelling agent is non-volatile—such as tall oil, as above described—and imparts this elasticity not only to the binder component, when set, but to the filler composition as a whole.

The tall oil, in the above composition, therefore serves as a substantially non-volatile plasticizer of the swollen flocs of Congo gum and also of the resin component.

The dissolved film scrap serves as a sleeking agent in the wetting vehicle, to facilitate spreading of the granules and flocs, as well as of the intervening films of adhesive.

In experimentation with the various materials and compositions above described, it has been observed that if the formula amount of un-run Congo gum be added to the remainder of the binder composition, an immediate change in the consistency of the latter occurs, which manifests itself as an increased resistance to stirring and increased resistance to flowing. Such increased resistance is in the nature of imparting plastic flow to the mass rather than increased viscosity. This change in consistency is best illustrated by causing samples of binder to flow from a spatula which has been dipped therein. Binder without Congo gum exhibits a smooth continuous flow tapering to a very narrow stream. Binder with Congo gum added, exhibits sluggish or interrupted plastic flow in which the stream breaks easily and recoils slightly after each break. Swollen particles or flocs of Congo gum are visible in such a binder but they present a sort of adherence or friction between one another, through the binder medium in order to give the above results. Freely floating particles, in a thin medium, would not result in a binder with such a sluggish flow, irregular break and elastic recoil after break.

If one extracts a portion of the un-run Congo gum with the active volatile solvent (ethyl acetate) used in the composition, and examines the results, it is found that a thin decantable liquid is present which, after filtration through a very fine filter paper, and subsequent evaporation, contains a dissolved fraction of the gum which becomes hard, clear, and very adhesive to glass, upon drying. The unevaporated residue upon the filter paper is more or less cohesive as a mass and hence the flocs of which it is composed manifest plastic flow instead of viscous flow, in which can be detected by the eye, the cohesive, swollen particles or flocs of gum. It is to this part of the swollen un-run Congo gum that we are principally indebted for the improved and characteristic spreading qualities and decreased segregation of the binder.

But, furthermore, if the decantable liquid fraction is filtered and the formula amount of film scrap added thereto, the dissolved gum coagulates from solution (as the film scrap dissolves) to a form almost identical with the above described flocculent material appearing on the filter paper. From this it is evident that in the formula practically 100% of the un-run Congo gum possesses or assumes the flocculent or swollen slimy plastic condition, in the presence of the swollen film scrap, and is therefore 100% effective in accordance with the present invention.

While the resinous material above described is at least 50% insoluble in aliphatic hydrocarbon liquid solvents, resinous materials of this type may vary in the insoluble constituent. The remainder of such resinous materials (which is soluble in aliphatic hydrocarbon solvents) is ordinary rosin. But rosin dissolves to form a solution of low viscosity and high penetrating power, which is undesirable. This is, however, offset in the present case by the swollen flocs of fossil gum. Therefore a lower percentage of the insoluble constituent of the resinous material used and a higher proportion of rosin is permissible though accompanied by increased fluidity. On the other hand, a resinous material having a higher proportion of the insoluble component will contribute greatly increased stiffness to the binder so that in such cases a larger proportion of non-volatile solvent or plasticizer is desirable.

Thus, a resinous material of this type which may be used in the present composition contains substantially 100% of the constituent insoluble in aliphatic hydrocarbon solvents, such as gasolene, of which Vinsol made by Hercules Powder Company is a representative example.

I claim:

1. Method of making shoe filler compositions, comprising as steps reducing an unrun fossil gum of the group consisting of Congo gum and Zanzibar gum to finely divided condition, dispersing the same, swelling the dispersed particles in an organic liquid swelling agent to form elastic flocs, and mixing with a granular resilient body material.

2. Method of making shoe filler compositions, comprising as steps dispersing finely divided particles of an unrun fossil gum of the group consisting of Congo gum and Zanzibar gum, in an organic liquid characterized by acting as a swelling agent thereof, to form elastic flocs and mixing with a granular, resilient body material.

3. Method of making shoe filler compositions, comprising as steps dispersing finely divided particles of an unrun Congo gum in an organic liquid characterized by acting as a swelling agent thereof, to form elastic flocs and mixing with a granular, resilient body material.

4. Method of making shoe filler compositions, comprising as steps dispersing finely divided particles of an unrun Congo gum in an organic liquid characterized by acting as a swelling agent thereof to form elastic flocs adding a wetting agent thereto, and mixing with a granular, resilient body material.

5. Method of making shoe filler compositions, comprising as steps dispersing finely divided particles of an unrun Congo gum in an organic liquid characterized by acting as a swelling agent thereof, to form elastic flocs, adding a sleeking agent thereto, and mixing with a granular, resilient body material.

6. Method of making shoe filler compositions, comprising as steps dispersing finely divided particles of an unrun Congo gum in an organic liquid characterized by acting as a swelling agent thereof, to form elastic flocs, adding an adhesive thereto, and mixing with a granular, resilient body material.

7. Method of making shoe filler compositions, comprising as steps dispersing finely divided particles of an unrun Congo gum in an organic liquid characterized by acting as a swelling agent thereof, to form elastic flocs, adding a sleeking agent and an adhesive thereto, and mixing with a granular, resilient body material.

8. Method of making shoe filler compositions, comprising as steps mixing swollen flocs of unrun Congo gum in tall oil, a resinous material derived from pine wood and characterized by being at least 50% insoluble in gasolene, a solution of film scrap in an organic solvent, and petroleum naphtha and mixing the resulting binder component with granular cork.

9. A shoe filler composition characterized by containing a granular, resilient solid material, and soft elastic flocs of a swollen insoluble unrun fossil gum of the class consisting of Congo gum and Zanzibar gum, the flocs whereof are wet by a liquid and are of a size commensurate with the size of the interstices between the granules of solid material, whereby plastic flow between said granules is provided.

10. A shoe filler composition characterized by containing a granular, resilient solid material, and soft elastic flocs of a swollen insoluble unrun fossil gum of the class consisting of Congo gum and Zanzibar gum, the flocs whereof are wet by a non-volatile liquid and are of a size commensurate with the size of the interstices between the granules of solid material, whereby plastic flow between said granules is provided.

11. A shoe filler composition characterized by containing a granular, resilient solid material, and soft elastic flocs of a swollen insoluble unrun fossil gum of the class consisting of Congo gum and Zanzibar gum, the flocs whereof are wet by a volatile liquid and are of a size commensurate with the size of the interstices between the granules of solid material, whereby plastic flow between said granules is provided.

12. A shoe filler composition characterized by containing a granular, resilient solid material, and soft elastic flocs of a swollen insoluble unrun fossil gum of the class consisting of Congo gum and Zanzibar gum, the flocs whereof are wet by a volatile and non-volatile liquid and are of a size commensurate with the size of the interstices between the granules of solid material, whereby plastic flow between said granules is provided.

13. A shoe filler composition characterized by containing a granular resilient body material and a binder component of swollen flocs of an insoluble unrun fossil gum of the class consisting of Congo gum and Zanzibar gum.

14. A shoe filler composition characterized by containing a granular resilient body material and a binder component of swollen flocs of an unrun Congo gum.

15. A shoe filler composition characterized by containing a granular resilient body material and a binder component of swollen flocs of an unrun Congo gum and a wetting agent.

16. A shoe filler composition characterized by containing a granular resilient body material and a binder component of swollen flocs of an unrun Congo gum and a sleeking agent.

17. A shoe filler composition characterized by containing a granular resilient body material and a binder component of swollen flocs of an unrun Congo gum and an adhesive.

18. A shoe filler composition characterized by containing a granular resilient body material and a binder component of swollen flocs of an unrun Congo gum and a sleeking agent and adhesive.

19. A shoe filler composition characterized by containing granular cork and a binder component of particles of unrun Congo gum, swollen to soft elastic flocs with tall oil, a resinous material derived from pine wood and characterized by being at least 50% insoluble in gasolene, film scrap dissolved in an organic solvent, and petroleum naphtha.

20. A set shoe filler composition characterized by containing a granular resilient body material and a binder component, in the interstices thereof, containing swollen elastic flocs of a fossil gum of the group consisting of unrun Congo gum and unrun Zanzibar gum, an adhesive, and a non-volatile plasticizer.

21. A set shoe filler composition characterized by containing a granular resilient body material in dense-packing formation, and a binder component, in the interstices thereof, containing swollen elastic flocs of a fossil gum of the group consisting of unrun Congo gum and unrun Zanzibar gum, an adhesive and a non-volatile plasticizer.

ERNEST D. SACKETT.